(12) United States Patent
Tashiro et al.

(10) Patent No.: US 12,409,796 B2
(45) Date of Patent: Sep. 9, 2025

(54) ELECTRICAL CONNECTION BOX INCLUDING LID WITH RIBS STABILIZING THE DOUBLE-WALLED CONSTRUCTION, AND AT LEAST ONE RIB SEALING ELECTRONICS COMPARTMENT

(71) Applicant: Yazaki Corporation, Tokyo (JP)

(72) Inventors: Hiroki Tashiro, Shizuoka (JP); Ryouichi Yokoyama, Shizuoka (JP); Takuma Kaneko, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 939 days.

(21) Appl. No.: 17/146,430

(22) Filed: Jan. 11, 2021

(65) Prior Publication Data

US 2021/0213895 A1 Jul. 15, 2021

(30) Foreign Application Priority Data

Jan. 14, 2020 (JP) ................................ 2020-003530

(51) Int. Cl.
*H02G 3/08* (2006.01)
*B60R 16/023* (2006.01)
*H02G 3/14* (2006.01)
*B60R 16/02* (2006.01)

(52) U.S. Cl.
CPC ......... *B60R 16/0238* (2013.01); *H02G 3/088* (2013.01); *H02G 3/14* (2013.01); *B60R 16/0207* (2013.01)

(58) Field of Classification Search
CPC ...... H02G 3/088; H02G 3/14; B60R 16/0239; H01R 13/46; H01R 13/533
See application file for complete search history.

(56) References Cited

U.S. PATENT DOCUMENTS

| | | | |
|---|---|---|---|
| 6,545,217 B2* | 4/2003 | Sato | ....................... H02G 3/088 174/64 |
| 10,547,165 B2* | 1/2020 | Ikeda | ................... B60R 16/0238 |
| 2017/0070040 A1 | 3/2017 | Kawada et al. | |
| 2018/0013276 A1 | 1/2018 | Ikeda et al. | |

FOREIGN PATENT DOCUMENTS

| | | |
|---|---|---|
| DE | 11 2016 001 937 T5 | 1/2018 |
| EP | 3 578 421 A1 | 12/2019 |
| JP | 2019-198145 A | 11/2019 |

* cited by examiner

*Primary Examiner* — Vanessa Girardi
(74) *Attorney, Agent, or Firm* — KENEALY VAIDYA LLP (57) ABSTRACT

A housing includes a housing main body and a lid body. The housing main body has a housing outer circumferential wall and a housing inner circumferential wall. The lid body has a top board, a lid body outer circumferential wall, a lid body inner circumferential wall, and ribs. An accommodation space includes a plurality of compartments that are positioned closer to the housing inner circumferential wall. The compartments include a first compartment that is positioned on a downstream side of a sealing rib in a water flow direction, and that is provided with electronic components that are able to accept electric power, and a second compartment that is positioned on an upstream side of the sealing rib, and that is not provided with the electronic components that are able to accept electric power.

13 Claims, 8 Drawing Sheets

FIG.8

ELECTRICAL CONNECTION BOX INCLUDING LID WITH RIBS STABILIZING THE DOUBLE-WALLED CONSTRUCTION, AND AT LEAST ONE RIB SEALING ELECTRONICS COMPARTMENT

CROSS-REFERENCE TO RELATED APPLICATION(S)

The present application claims priority to and incorporates by reference the entire contents of Japanese Patent Application No. 2020-003530 filed in Japan on Jan. 14, 2020.

BACKGROUND OF THE INVENTION

1. Field of the Invention

The present invention relates to a housing and an electrical connection box,

2. Description of the Related Art

An electrical connection box mounted in a vehicle accommodates in an integrated manner, in an accommodation space therein, electronic components including connectors, fuses, relays, and capacitors, for example. Such an electrical connection box includes a housing including a housing main body that is formed into a frame shape having an opening part, and that has an accommodation space therein that accommodates electronic components, and a lid body that is stacked upward on the housing main body in upper and lower directions, and that seals the opening part.

A housing main body of this kind includes a housing outer circumferential wall that extends in circumferential directions, and a housing inner circumferential wall that is positioned inside of the housing outer circumferential wall to configure a double-structured circumferential wall part (e.g., see Japanese Patent Application Laid-open No. 2019-198145). In the double-structured circumferential wall part of the housing main body of the housing, a circumferential wall part of the lid body is positioned between the housing outer circumferential wall and the housing inner circumferential wall, accordingly preventing water from entering the accommodation space that is positioned in the housing main body.

However, when a pressure washer is used to wash the vehicle, or when the vehicle runs in heavy rain, for example, pressurized or splashed water may hit the housing outer circumferential wall of such a housing. If such a state that water hits the housing outer circumferential wall of the housing continues for a long period of time, the water may move upward on a surface of the housing outer circumferential wall, and the water may then reach an upper end part of the housing outer circumferential wall, Such water may enter a space part that surrounds the accommodation space that the lid body outer circumferential wall, the lid body inner circumferential wall, and the upper end part of the housing outer circumferential wall form, and that accommodates the electronic components, and the water may then flow in the space part. When such a state that the water hits the housing outer circumferential wall that is positioned on one side in first orthogonal directions orthogonal to the upper and lower directions continues for a long period of time, the water may flow in the space part described above from the one side toward the other side in the first orthogonal directions, and may enter the accommodation space that is positioned in the housing main body. At this time, since, with the conventional electrical connection box, water flows in the space part, it is difficult to identify a location at which the water will enter the accommodation space.

SUMMARY OF THE INVENTION

The present invention has been made in view of the issues described above, and an object of the present invention is to provide a housing and an electrical connection box that control a location at which water may enter an accommodation space, making it possible to reduce the occurrence of such an event that electronic components that are able to accept electric power are affected.

In order to achieve the above mentioned object, a housing according to one aspect of the present invention includes a housing main body that is formed into a frame shape having an opening part, and that has an accommodation space accommodating electronic components therein; and a lid body that is stacked upward on the housing main body in upper and lower directions, and that seals the opening part, wherein the housing main body has a housing outer circumferential wall, and a housing inner circumferential wall that is positioned inside of the housing outer circumferential wall, the lid body has a top board having a plate shape, a lid body outer circumferential wall that projects from a circumferential part of the top board toward the housing main body in the upper and lower directions, a lid body inner circumferential wall that is positioned inside of the lid body outer circumferential wall, and that surrounds, with the lid body outer circumferential wall, the housing outer circumferential wall that is inserted, and ribs that couple the lid body outer circumferential wall and the lid body inner circumferential wall, the accommodation space includes a plurality of compartments that are positioned adjacent to the housing inner circumferential wall, the lid body outer circumferential wall, the lid body inner circumferential wall, and an upper end part of the housing outer circumferential wall form a space part that surrounds the accommodation space, a gap is formed at least either between the lid body outer circumferential wall and the housing outer circumferential wall and between the lid body inner circumferential wall and the housing outer circumferential wall, the ribs include a sealing rib that is disposed and spaced in first orthogonal directions orthogonal to the upper and lower directions, and that seals the space part, the compartments include a first compartment that is positioned on a downstream side of the sealing rib in a water flow direction in which, when water enters the space part, the water flows, among the first orthogonal directions, and that is provided with the electronic components capable of accepting electric power, and a second compartment that is positioned on an upstream side of the sealing rib, and that is not provided with the electronic components capable of accepting electric power, and the sealing rib is positioned outside of the accommodation space in the second compartment in the second orthogonal directions orthogonal to the upper and lower directions and the first orthogonal directions, According to another aspect of the present invention, in the housing, it is preferable that the housing has a corner part positioned between a part where the housing outer circumferential wall and the housing inner circumferential wall extend in the first orthogonal directions and a part where the housing outer circumferential wall and the housing inner circumferential wall extend in the second orthogonal directions, and the Corner part is positioned on the downstream side of the first compartment in the water flow direction.

According to still another aspect of the present invention, in the housing, it is preferable that the upper end part of the housing outer circumferential wall has an inclined part that is inclined from one side toward another side in the first orthogonal directions and from a lower side toward an upper side in the upper and lower directions, and a flat part that is flat in the upper and lower directions, the sealing rib is disposed between the inclined part and the flat part, the first compartment is disposed adjacent to the corner part, and the corner part is disposed on the flat part, According to still another aspect of the present invention, in the housing, it is preferable that the ribs include area reduction ribs that reduce the space part in area, and the area reduction ribs are positioned on the upstream side of the sealing rib in the water flow direction.

According to still another aspect of the present invention, in the housing, it is preferable that the housing main body further has housing couplers that couple the housing outer circumferential wall and the housing inner circumferential wall, the housing couplers are provided to be spaced from each other in the first orthogonal directions, and the housing couplers, the housing outer circumferential wall, and the housing inner circumferential wall form a discharge space that is in Communication with the space part via the gap and that extends downward.

In order to achieve the above mentioned object, an electrical connection box according to still another aspect of the present invention includes at least one or more electronic components; and a housing that accommodates the electronic components in an accommodation space therein, wherein the housing includes a housing main body that is formed into a frame shape having an opening part, and that has the accommodation space accommodating electronic components therein, and a lid body that is stacked upward on the housing main body in upper and lower directions, and that seals the opening part, the housing main body has a housing outer circumferential wall, and a housing inner circumferential wall that is positioned inside of the housing outer circumferential wall, the lid body has a top board having a plate shape, a lid body outer circumferential wall that projects from a circumferential part of the top board toward the housing main body in the upper and lower directions, a lid body inner circumferential wall that is positioned inside of the lid body outer circumferential wall, and that surrounds, with the lid body outer circumferential wall, the housing outer circumferential wall that is inserted, and ribs that couple the lid body outer circumferential wall and the lid body inner circumferential wall, the accommodation space includes a plurality of compartments that are positioned adjacent to the housing inner circumferential wall, the lid body outer circumferential wall, the lid body inner circumferential wall, and an upper end part of the housing outer circumferential wall form a space part that surrounds the accommodation space, a gap is formed at least either between the lid body outer circumferential wall and the housing outer circumferential wall and between the lid body inner circumferential wall and the housing outer circumferential wall, the ribs include a sealing rib that is disposed and spaced in first orthogonal directions orthogonal to the upper and lower directions, and that seals the space part, the compartments include a first compartment that is positioned on a downstream side of the sealing rib in a water flow direction in which, when water enters the space part, the water flows, among the first orthogonal directions, and that is provided with the electronic components capable of accepting electric power, and a second compartment that is positioned on an upstream side of the sealing rib, and that is not provided with the electronic components capable of accepting electric power, and the sealing rib is positioned outside of the accommodation space in the second compartment in the second orthogonal directions orthogonal to the upper and lower directions and the first orthogonal directions.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention will now be described in detail with reference to the accompanying drawings. Note that the embodiment is not intended to limit the invention. Note that components in the embodiment described below include ones easily replaced by one skilled in the art or substantially identical ones.

Figure 1:
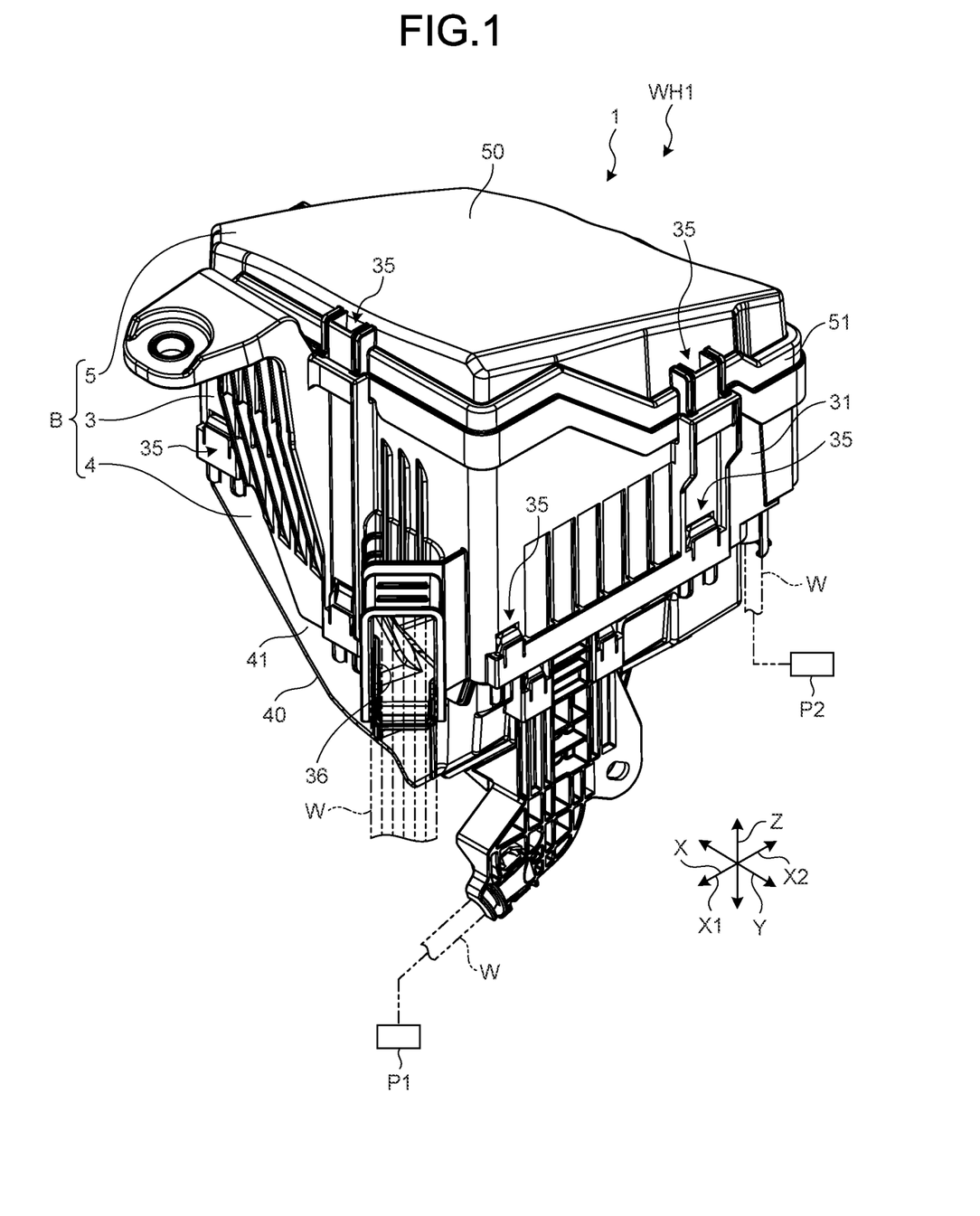
FIG. 1 is a perspective view illustrating a housing and an electrical connection box according to a present embodiment.
Figure 2:
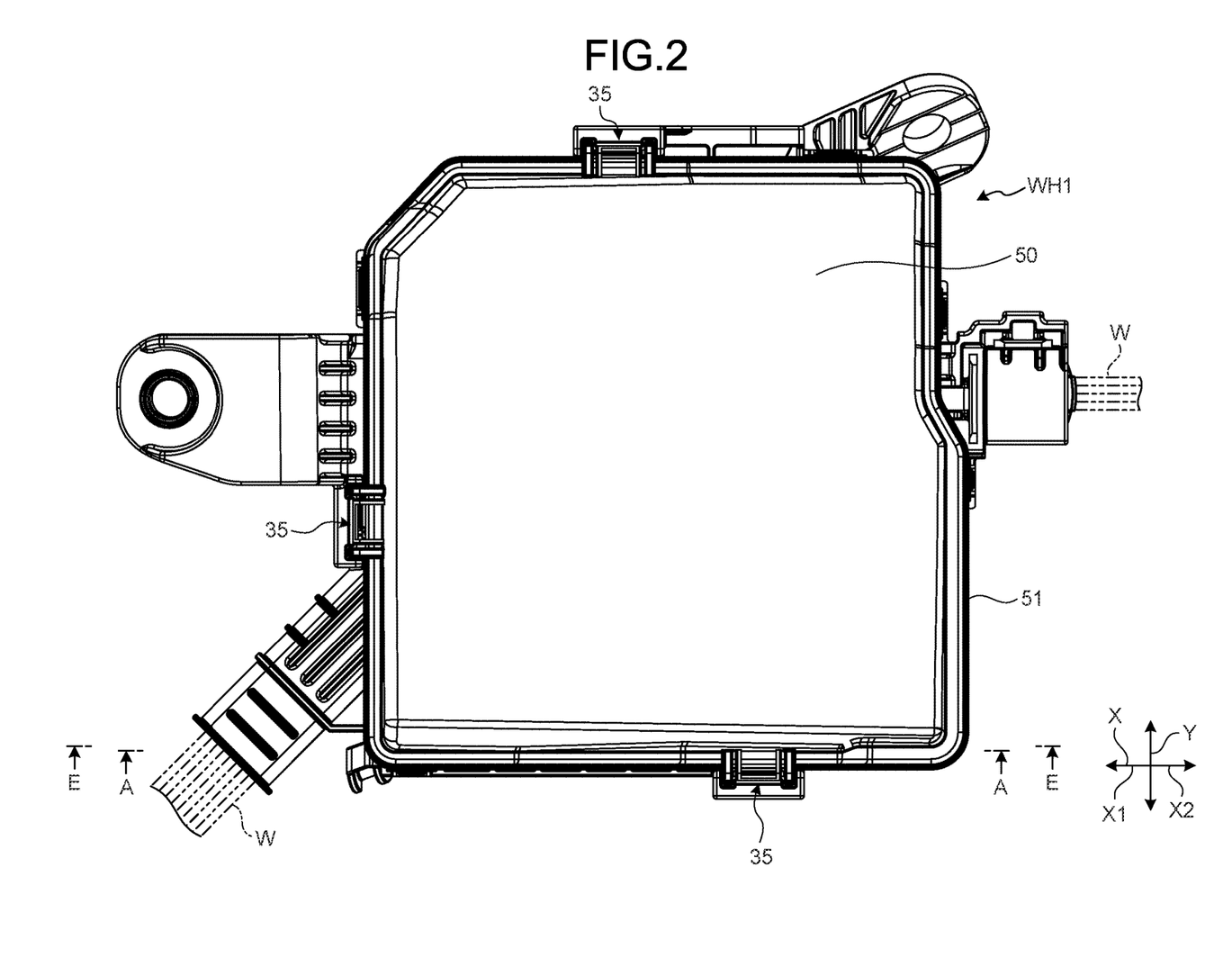
FIG. 2 is a plan view illustrating the housing and the electrical connection box according to the present embodiment.
Figure 3:
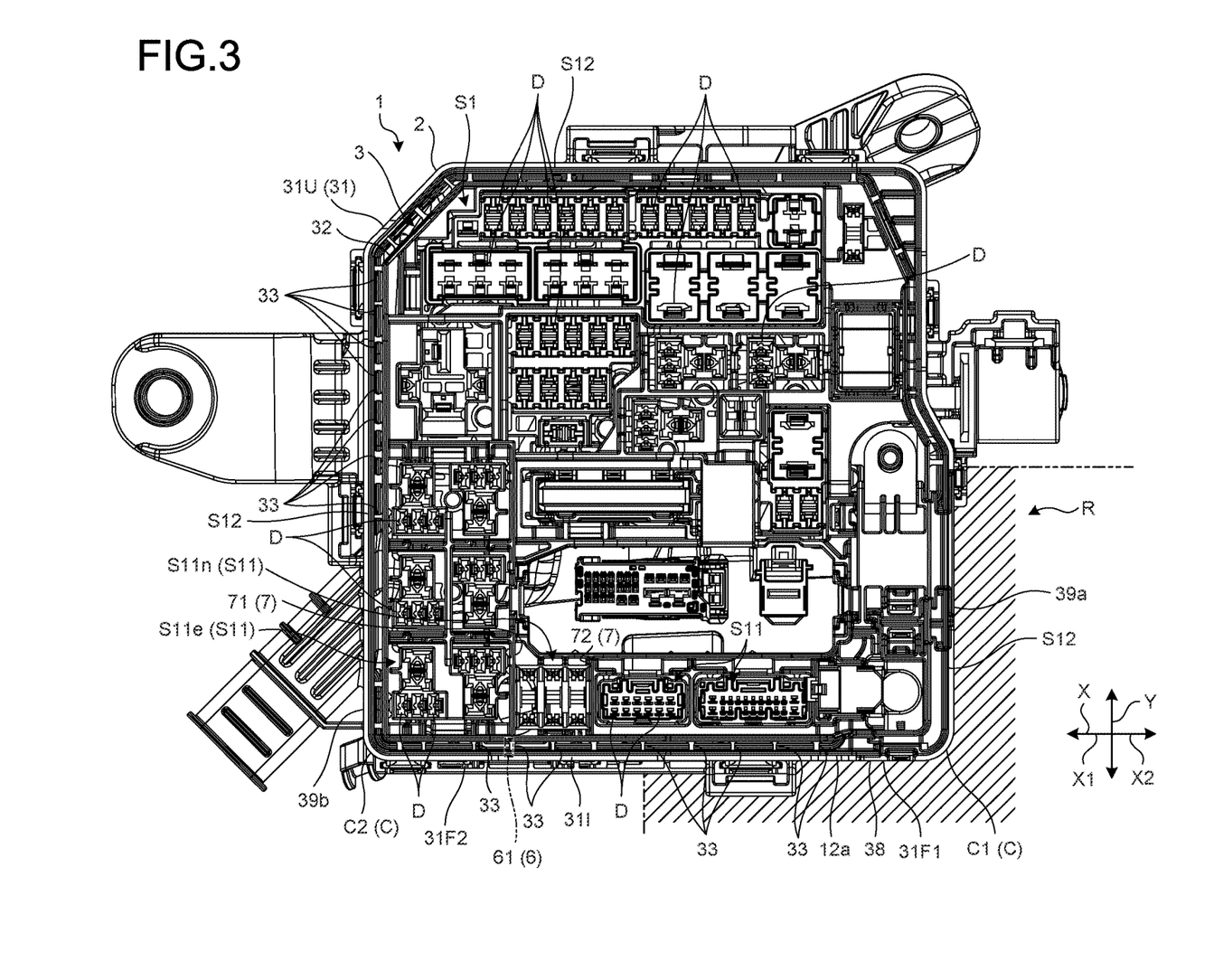
FIG. 3 is a plan view illustrating a housing main body when a lid body is removed from the housing main body in the housing and the electrical connection box according to the present embodiment.
Figure 4:
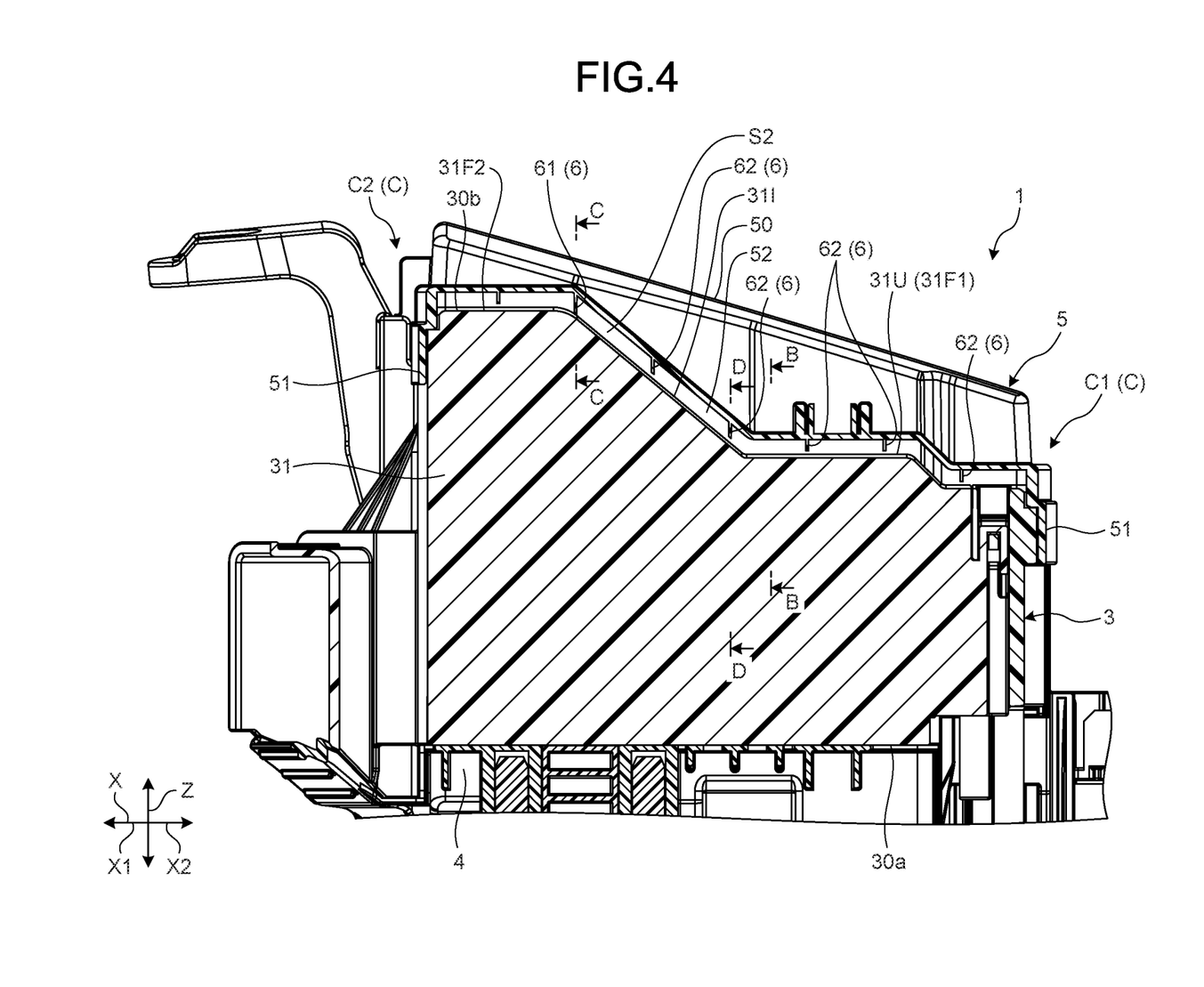
FIG. 4 is a cross-sectional view taken along line A-A in FIG. 2.
Figure 5:
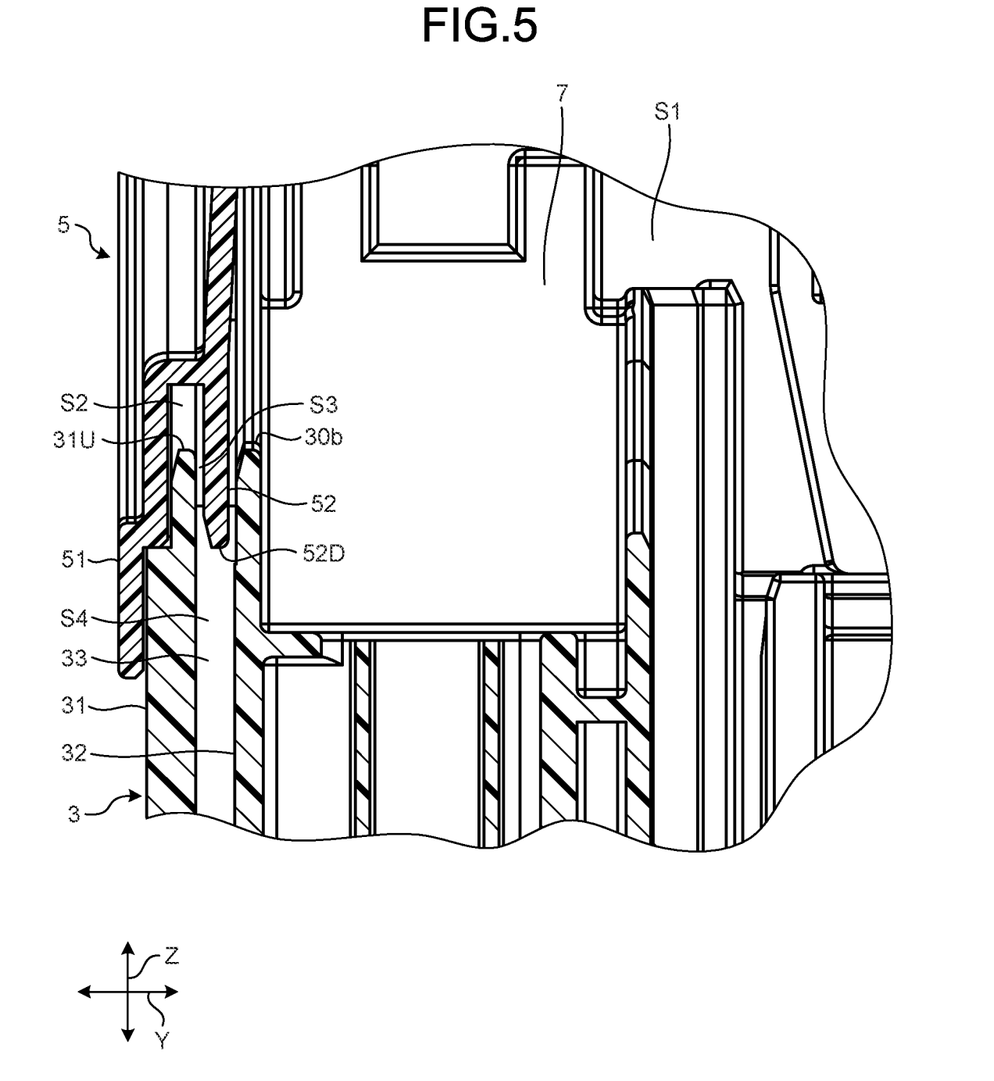
FIG. 5 is a cross-sectional view taken along line B-B in FIG. 4.
Figure 6:
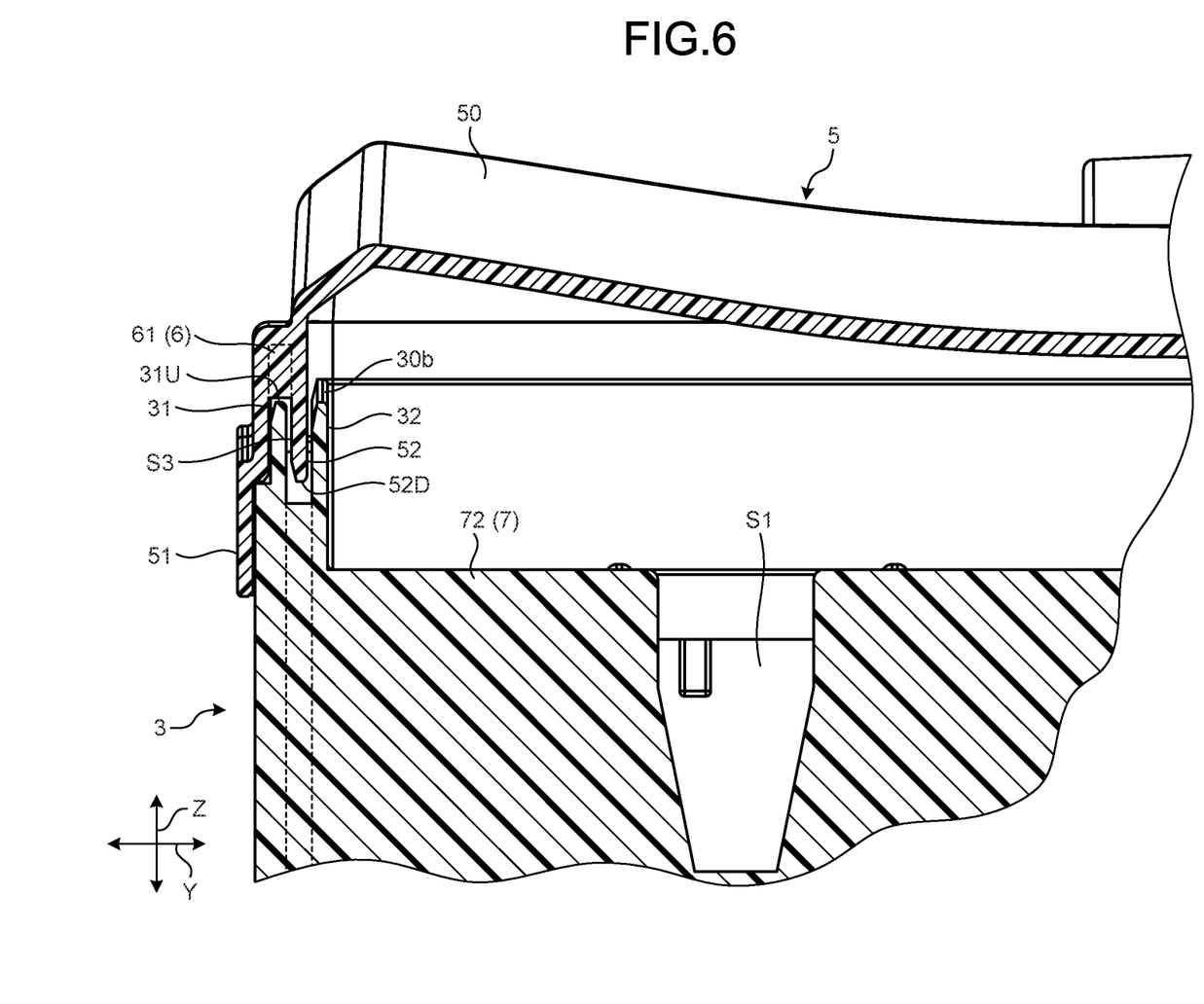
FIG. 6 is a cross-sectional view taken along line C-C in FIG. 4.

FIG. 1 is a perspective view illustrating a housing B and an electrical connection box 1 according to the embodiment. FIG. 2 is a plan view illustrating the housing B and the electrical connection box 1 according to the embodiment. FIG. 3 is a plan view illustrating a housing main body 3 when a lid body 5 is removed from the housing main body 3 in the housing B and the electrical connection box 1 according to the embodiment. FIG. 4 is a cross-sectional view taken along line A-A in FIG. 2. FIG. 5 is a cross-sectional view taken along line B-B in FIG. 4. FIG. 6 is a cross-sectional view taken along line C-C in FIG. 4.

Figure 7:
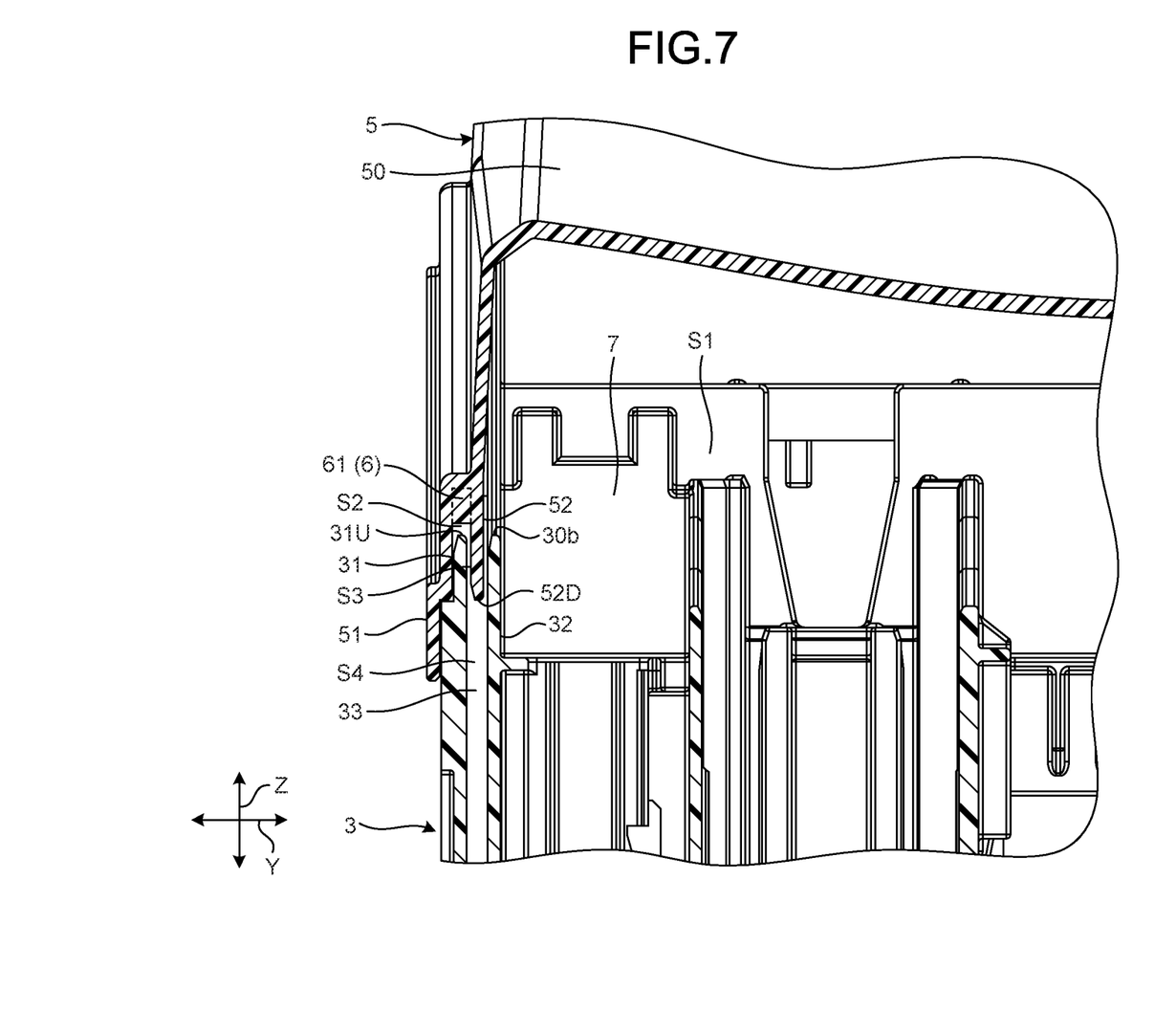
FIG. 7 is a cross-sectional view taken along line D-D in FIG. 4.
Figure 8:
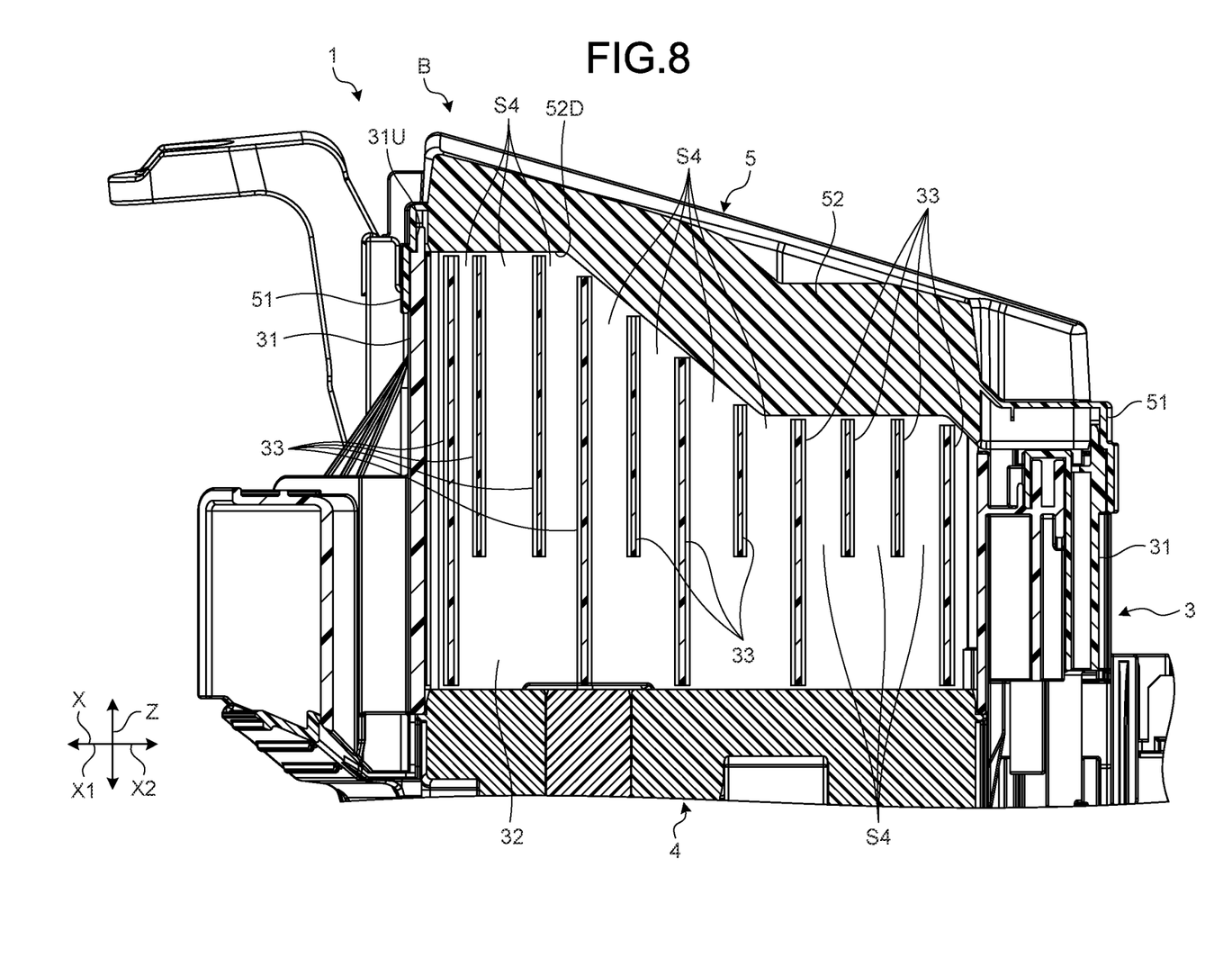
FIG. 8 is a cross-sectional view taken along line E-E in FIG. 2.

FIG. 7 is a cross-sectional view taken along line D-D in FIG. 4. FIG. 8 is a cross-sectional view taken along line E-E in FIG. 2. In the following description, upper and lower directions Z, first orthogonal directions X, and second orthogonal directions Y are orthogonal to each other. Furthermore, while the electrical connection box 1 is mounted in a vehicle, and the vehicle is positioned on a horizontal plane, the first orthogonal directions X and the second orthogonal directions Y extend in horizontal directions. The upper and lower directions Z correspond to directions in which, when the electrical connection box 1 is mounted in the vehicle, and the vehicle is positioned on the horizontal plane, the vehicle vibrates, and correspond to stacking directions of the housing main body 3, a bottom body 4, and the lid body 5, described later. Directions used below are described as, unless otherwise stated, directions in which parts are assembled with each other, and the electrical connection box 1 is mounted in the vehicle.

Embodiment

The electrical connection box 1 according to the present embodiment illustrated in FIGS. 1, 2, and 3 is mounted in a vehicle such as a car, and assembled to a wire harness WH1, To couple electronic devices (not illustrated) mounted in the vehicle with each other, for example, the wire harness WH1 serves as an assembly that is bundled with a plurality of wiring materials W used for electric power supply and signal communications, and that uses connectors, for example, to couple the wiring materials W with electronic components D. The wire harness WH1 includes the wiring materials W each having an electrically conductive property, and the electrical connection box 1 electrically coupled to the wiring materials W. The wiring materials W include, for example, metallic bars, electric wires, and electric wire bundles. A metallic bar is one having a bar-shaped member having an electrically conductive property externally covered with a cover having an electrically insulating property, An electric wire is one having a conductor (core wire) including a plurality of metallic element wires having an electrically conductive property externally covered with a cover having an electrically insulating property. An electric wire bundle is one having the electric wires described above bundled. In FIGS. 1 and 2, some of the wiring materials W are illustrated with solid lines, the rest of the wiring materials W are illustrated with virtual lines, and, in other drawings, the wiring materials W are omitted. In the wire harness WH1, the wiring materials W are bundled in an integrated manner, and are electrically coupled to the electrical connection box 1 via connectors, for example, provided at ends of the wiring materials W that are bundled. In addition, the wire harness WH1 may further include grommets, protectors, exterior materials, and fixtures, for example.

The electrical connection box 1 accommodates in an integrated manner the electronic components D including connectors, fuses, relays, capacitors, and an electronic control unit, for example. The electrical connection box 1 is provided in an engine compartment or a cabin of the vehicle, for example. To describe more specifically, in the electrical connection box 1 according to the present embodiment, a region R (a region hatched with oblique lines in FIG. 3) is set. In the region R, when a pressure washer is used to wash the vehicle, or when the vehicle runs in heavy rain, pressurized or splashed water may hit a housing outer circumferential wall 31 described later for a long period of time. In the electrical connection box 1 according to the present embodiment, the region R is positioned closer to one side than a center in the first orthogonal directions X, and is positioned closer to another side than a center in the second orthogonal directions Y, for example. For other regions than the region R in the electrical connection box 1 according to the present embodiment, pressurized or splashed water is not assumed to hit the housing outer circumferential wall 31 for a long period of time. In the region R set in the electrical connection box 1 according to the present embodiment, onto which pressurized or splashed water hits, water stays in a space part S2 described later, and, when the water flows in the space part S2, the water flows from the one side toward another side in the first orthogonal directions X. That is, in FIG. 3, water flows, in a water flow direction X1, from a right-hand side, that is, the one side toward a left-hand side, that is, the other side in the first orthogonal directions X. The first orthogonal directions X include the water flow direction X1 and an opposite direction X2.

In the electrical connection box 1, a first electric power supply P1 and a second electric power supply P2 (see FIG. 1) are electrically coupled, via the wiring materials W, for example, to the electronic devices mounted in the vehicle. The first electric power supply P1 is either of the battery and the alternator, and the second electric power supply P2 is the other of the battery and the alternator. The electrical connection box 1 distributes electric power that the electric power supplies P1 and P2 supply to the electronic devices in the vehicle. The electrical connection box 1 is sometimes referred to as a junction box, a fuse box, or a relay box, for example, and, in the present embodiment, the boxes are collectively referred to as the electrical connection box 1. The configuration of the electrical connection box 1 will now be described in detail with reference to the accompanying drawings. Specifically, the electrical connection box 1 includes the electronic components D, the housing B, and blocks 2.

The electronic components D are, as illustrated in FIG. 3, parts assembled to the blocks 2 and provided in the housing B to exert various functions. The electronic components D are provided in plurality in an accommodation space S1, and are each electrically coupled to the wiring materials W. The electronic components D include, for example, capacitors, relays, resistors, transistors, fuses, connectors, intelligent power switches (IPSs), and microcomputers. The electrical connection box 1 according to the present embodiment includes at least one of the electronic components D.

The housing B accommodates, in the accommodation space S1 that is formed therein, the blocks 2 assembled with the electronic components D. The housing B includes, as illustrated in FIG. 1, the housing main body 3 serving as a frame, the bottom body 4 serving as a lower cover, and the lid body 5 serving as an upper cover, for example. The housing B has a three-layered, divided structure divided into the housing main body 3, the bottom body 4, and the lid body 5. The housing main body 3, the bottom body 4, and the lid body 5 are made of synthetic resin having an electrically insulating property. The housing main body 3, the bottom body 4, and the lid body 5 are stacked and assembled with each other in the housing B in the predetermined stacking directions (the upper and lower directions Z as an example in here). With this configuration, the housing main body 3, the bottom body 4, and the lid body 5 as a plurality of members are assembled with each other and the housing B is formed into a hollow box shape as a whole. The housing main body 3, the bottom body 4, and the lid body 5 internally form spaces in the housing B.

Among the spaces formed in the housing B, the accommodation space S1 is a space that accommodates the electronic components D. The housing main body 3 forms the accommodation space S1, for example. The housing B according to the present embodiment includes a plurality of compartments S11 that are positioned adjacent to a housing inner circumferential wall 32. The compartments S11 include a first compartment S11e provided with the electronic components D that are able to accept electric power, and a second compartment S11n provided with the electronic components D that are able to accept electric power. The second compartment S11n is provided with the electronic components D that are spare components and are thus not supplied with electric power, for example. In the housing B and the electrical connection box 1 according to the present embodiment, the compartments S11 are disposed in the accommodation space S1.

In the electrical connection box 1, for example, the wiring materials W are wired in the accommodation space S1 through an insertion hole 36 (see FIG. 1) formed in the housing main body 3. In the electrical connection box 1, for example, the blocks 2 described later are provided in the accommodation space S1, and the wiring materials W are coupled to the blocks 2.

The blocks 2 are configured to be mountable with the electronic components D, and are detachably assembled to the housing B. The blocks 2 are made of synthetic resin having an electrically insulating property. The blocks 2 are provided in plurality in the housing B, for example.

In the blocks 2, the wiring materials W and the electronic components D are assembled, and the wiring materials W are electrically coupled to the electronic components D. For example, in cavities of the blocks 2, terminals provided at the ends of the wiring materials W are inserted and fitted from one side (a side on which the bottom body 4 is positioned, typically) in the upper and lower directions z. On the other hand, in the cavities of the blocks 2, the electronic components D are inserted and fitted from another side (a side on which the lid body 5 is positioned, typically) in the upper and lower directions Z. With this configuration, the electronic components D and the wiring materials W are assembled and mounted in the blocks 2 and electrically coupled with each other, configuring required electric circuits.

The housing main body 3 is a main member forming the housing B. The housing main body 3 is, as illustrated in FIG. 4, formed into a frame shape having, on its two surfaces facing each other in the upper and lower directions Z, opening parts 30a and 30b.

That is, the housing main body 3 is formed into the frame shape having the opening parts 30a and 30b. The housing main body 3 described above has the accommodation space S1 that accommodates the electronic components D. The bottom body 4 is a dish-shaped (tray-shaped) member covering the opening part 30a that is positioned on a lower side, in the upper and lower directions Z, of the housing main body 3. That is, the bottom body 4 is stacked under the housing main body 3 in the upper and lower directions Z to seal the opening part 30a. The lid body 5 is a lid-shaped (cover-shaped) member covering the opening part 30b that is positioned on an upper side, in the upper and lower directions Z, of the housing main body 3. That is, the lid body 5 is stacked upward on the housing main body 3 in the upper and lower directions Z to seal the opening part 30b. In the housing B, one of the opening parts of the housing main body 3, that is, the opening part 30a, is positioned to face the bottom body 4, and the other of the opening parts of the housing main body 3, that is, the opening part 30b, is positioned to face the lid body 5. In the housing B, under this positional relation, the bottom body 4 is assembled on the lower side, in the upper and lower directions 2, of the housing main body 3, and the lid body 5 is assembled on the upper side, in the upper and lower directions Z, of the housing main body 3. The housing B includes, as illustrated in FIGS. 1 and 2, lock mechanisms 35 in various styles, and, via the lock mechanisms 35, the bottom body 4 and the lid body 5 are locked to the housing main body 3. With this configuration, the housing B is formed into a box shape as a whole. The blocks 2 assembled to the housing main body 3 have, as illustrated in FIG. 3, partition walls 7 that internally partition the accommodation space S1. The partition walls 7 are provided in plurality in the accommodation space S1. The partition walls 7 include a first partition wall 71 and a second partition wall 72 that partition the first compartment S11e and the second compartment S11n described later.

The housing main body 3 has, as illustrated in FIG. 5, the housing outer circumferential wall 31, and the housing inner circumferential wall 32 that is positioned inside of the housing outer circumferential wall 31. The housing B according to the present embodiment further includes housing couplers 33 (see FIG. 8) that couple the housing outer circumferential wall 31 and the housing inner circumferential wall 32. The housing outer circumferential wall 31 has an upper end part 310 at its upper end part in the upper and lower directions Z. The housing outer circumferential wall 31 and the housing inner circumferential wall 32 are each formed into a plate shape, forming a double-structured housing wall part.

The housing B has, as illustrated in FIG. 3, corner parts C1 and C2 that are positioned between a part 38 where the housing outer circumferential wall 31 and the housing inner circumferential wall 32 extend in a straight line in the first orthogonal directions X and parts 39a and 39b where the housing outer circumferential wall 31 and the housing inner circumferential wall 32 extend in a straight line in the second orthogonal directions Y. That is, the housing B according to the present embodiment has two corner parts C that are positioned between the part 38 where the housing outer circumferential wall 31 and the housing inner circumferential wall 32 extend in the first orthogonal directions X and the parts 39a and 39b where the housing outer circumferential wall 31 and the housing inner circumferential wall 32 extend in the second orthogonal directions Y. In the housing B according to the present embodiment, one of the two corner parts C, that is, the Corner part C1, is disposed inside of the region R, and the other one, that is, the corner part C2, is disposed outside of the region R.

The upper end part 310 of the housing outer circumferential wall 31 has, as illustrated in FIG. 4, an inclined part 311 that is inclined from the one side toward the other side in the first orthogonal directions X and from the lower side toward the upper side in the upper and lower directions Z, and flat parts 31F1 and 31F2 that are flat in the upper and lower directions Z. The inclination angle of the inclined part 311 of the housing outer circumferential wall 31 according to the present embodiment is constant relative to the horizontal plane. In the upper end part 310 of the housing outer circumferential wall 31 according to the present embodiment, one corner part, that is, the corner part C1, is disposed on the flat part 31F1 that is positioned closer to the lower side in the upper and lower directions Z, and the other corner part, that is, the corner part C2, is disposed on the flat part 31F2 that is positioned closer to the upper side in the upper and lower directions Z.

The lid body 5 has, as illustrated in FIG. 1, a top board 50 having a lid shape, a lid body outer circumferential wall 51 that projects from a circumferential part of the top board 50 toward the housing main body 3 in the upper and lower directions Z, a lid body inner circumferential wall 52 (see FIG. 5) that is positioned inside of the lid body outer circumferential wall 51, and that surrounds, with the lid body outer circumferential wall 51, the housing outer circumferential wall 31 that is inserted, and ribs 6 that couple the lid body outer circumferential wall 51 and the lid body inner circumferential wall 52 (see FIGS. 4, 6, and 7). The lid body outer circumferential wall 51 and the lid body inner circumferential wall 52 are each formed into a plate shape, forming a double-structured lid body wall part. The lid body inner circumferential wall 52 has a lower end part 52D at its lower end part in the upper and lower directions Z.

In the housing B, as illustrated in FIGS. 4, 5, 6, and 7, the lid body outer circumferential wall 51, the lid body inner circumferential wall 52, and the upper end part 31U of the housing outer circumferential wall 31 form the space part S2 that surrounds the accommodation space S1.

In the housing B according to the present embodiment, as illustrated in FIGS. 5, 6, and 7, a gap S3 is formed between the lid body inner circumferential wall 52 and the housing outer circumferential wall 31.

The housing couplers 33 are, as illustrated in FIG. 8, at least provided to be spaced from each other in the first orthogonal directions X, and the housing couplers 33, the housing outer circumferential wall 31, and the housing inner circumferential wall 32 form a discharge space S4 that is in communication with the space part S2 via the gap S3 and that extends downward.

The bottom body 4 has a bottom body plate 40 having a dish shape, and a bottom body outer circumferential wall 41 that projects from a circumferential part of the bottom body plate 40 toward the housing main body 3 in the upper and lower directions Z. Although not illustrated, the bottom body 4 further has, similarly to the lid body 5, a bottom body inner circumferential wall that is positioned inside of the bottom body outer circumferential wall 41, and that surrounds, with the bottom body outer circumferential wall 41, the housing outer circumferential wall 31 that is inserted, and bottom body ribs that couple the bottom body outer circumferential wall 41 and the bottom body inner circumferential wall. The bottom body outer circumferential wall 41 and the bottom body inner circumferential wall are each formed into a plate shape, forming a double-structured lid body wall part.

The ribs 6 restrict both the lid body outer circumferential wall 51 and the lid body inner circumferential wall 52 from moving in position in the first orthogonal directions X and the second orthogonal directions Y. The ribs 6 described above are, as illustrated in FIGS. 4, 6, and 7, provided to be spaced in the circumferential directions of the space part S2. That is, in the housing B and the electrical connection box 1 according to the present embodiment, the ribs 6 are provided to be spaced from each other at least in the first orthogonal directions X. The ribs 6 described above include a sealing rib 61, and area reduction ribs 62 that are reduced in area as compared with the sealing rib 61.

The sealing rib 61 seals the space part S2 described above. The sealing rib 61 preferably seals the space part S2 as much as possible. However, as illustrated in FIG. 6, a small space is formed between the sealing rib 61 according to the present embodiment and the upper end part 31U of the housing outer circumferential wall 31. However, the space falls within a range of error, and, even when such a space as described above is present at a middle location in the water flow direction X1, an amount of water that passes through the sealing rib 61 from from an upstream side toward a downstream side in the water flow direction X1 is negligible, disallowing the water to enter the accommodation space S1. In the housing B and the electrical connection box 1 according to the present embodiment, a first side S12a (see FIG. 3) that extends in the first orthogonal directions X, among sides S12 that form a circumference of the accommodation space S1, has one sealing rib, that is, the sealing rib 61. The sealing rib 61 is positioned outside of the second compartment S11n in the second orthogonal directions Y. To describe more specifically, the sealing rib 61 is disposed at a boundary between the first compartment S11e and the second compartment S11n in the water flow direction X1. In the present embodiment, the expression "the sealing rib 61 is positioned outside of the second compartment S11n in the second orthogonal directions Y" includes a state where the second compartment S11n and the sealing rib 61 face each other in the second orthogonal directions Y, and a state where the first compartment S11e and the second compartment S11n are positioned adjacent to each other in the first orthogonal directions X, and the sealing rib 61 is positioned at the boundary between the first compartment S11e and the second compartment S11n. Since the sealing rib 61, the first compartment S11e, and the second compartment S11n are configured as described above, the compartments S11 include the first compartment S11e that is positioned on the downstream side of the sealing rib 61, and the second compartment S11n that is positioned on the upstream side of the sealing rib 61 in the water flow direction X1. The corner part C2 is positioned on the downstream side of the first compartment S11e in the water flow direction X1, and is disposed on the flat part 31F2. Furthermore, the first compartment S11e is disposed adjacent to the corner part C2. Furthermore, the sealing rib 61 is disposed between the inclined part 31I and the flat part 31F2.

The area reduction ribs 62 reduce the space part S2 in area. The area reduction ribs 62 are at least positioned on the upstream side of the sealing rib 61 in the water flow direction X1. In the housing B and the electrical connection box 1 according to the present embodiment, the area reduction ribs 62 are provided in plurality on the upstream side of the sealing rib 61. The area reduction ribs 62 described above are not present on the downstream side of the sealing rib 61 in the water flow direction X1.

Next, a case where pressurized or splashed water hits the housing outer circumferential wall 31 described above will be described. Pressurized or splashed water is assumed to hit the region R illustrated in FIG. 3 for a long period of time, and pressurized or splashed water is not assumed to hit other regions than the region R for a long period of time.

When pressurized or splashed water hits the housing outer circumferential wall 31 and such a state continues for a long period of time, the water moves upward on an outer surface of the housing outer circumferential wall 31, and reaches the upper end part 310 of the housing outer circumferential wall 31. The water described above then stays in the space part S2. The water that stays in the space part S2 is discharged to the outside of the housing B through the gap S3 and the discharge space S4. However, if an amount of water that enters the space part S2 is greater than an amount of water that is discharged, water stays in the space part S2 on the flat part 31F1. If such a state continues, the water goes up the inclined part 31I having a rising gradient in the water flow direction X1. However, when the water in the space part S2 comes into contact with the area reduction ribs 62, the water is discharged to the outside of the housing B. When the water in the space part S2 comes into contact with the sealing rib 61, the water is then discharged to the second compartment S11n that is not provided with the electronic components D that are able to accept electric power, in the accommodation space S1. Apart from the housing B according to the present embodiment that has the sealing rib 61, water may further stay in the space part S2 in a housing that does not have the sealing rib 61, resulting in that the water reaches the corner part C2.

The housing B and the electrical connection box 1 according to the present embodiment are configured as described below. The housing B has the housing outer circumferential wall 31, and the housing inner circumferential wall 32 that is positioned inside of the housing outer circumferential wall 31, and the housing outer circumferential wall 31 is positioned between the lid body outer circumferential wall 51 and the lid body inner circumferential wall 52. Therefore, water flowing in the space part S2 is prevented from coming over the upper end part 310 of the housing inner circumferential wall 32, and the housing inner circumferential wall 32 can prevent water from entering the accommodation space S1.

The housing B and the electrical connection box 1 according to the present embodiment are configured as described below. The compartments S11 include the first compartment S11e that is positioned on the downstream side of the sealing rib 61 in the water flow direction X1 in which, when water enters the space part S2, the water flows, among the first orthogonal directions X, and that is provided with the electronic components D that are able to accept electric power, and the second compartment S11n that is positioned on the upstream side of the sealing rib 61, and that is not provided with the electronic components D that are able to accept electric power. The sealing rib 61 is positioned outside of the accommodation space S1 in the second compartment S11n in the second orthogonal directions Y. Therefore, the housing B and the electrical connection box 1 according to the present embodiment allow the sealing rib 61 to prevent water from flowing toward the downstream side of the sealing rib 61. Therefore, on the downstream side of the sealing rib 61, it is possible to prevent water from entering the accommodation space S1. Even when such a state that water hits the housing outer circumferential wall 31 continues for a long period of time, and the water flows in the space part S2, the sealing rib 61 prevents the water in the space part S2 from flowing further, discharging the water toward outside of the accommodation space S1, on outside of the second compartment S11n that is not provided with the electronic components D that are able to accept electric power. Furthermore, even when water enters the accommodation space S1, the water is discharged to the second compartment S11n that is not provided with the electronic components D that are able to accept electric power, in the accommodation space S1. With the configuration described above, the housing B and the electrical connection box 1 according to the present embodiment make it possible to prevent water from coming into contact with the electronic components D that are able to accept electric power. As a result, the housing B and the electrical connection box 1 according to the present embodiment make it possible to control a location at which water may enter the accommodation space S1, making it possible to reduce the occurrence of such an event that the electronic components D that are able to accept electric power are affected.

The housing B and the electrical connection box 1 according to the present embodiment are configured as described below. The housing B has the corner part C2 that is positioned between the part 38 where the housing outer circumferential wall 31 and the housing inner circumferential wall 32 extend in the first orthogonal directions X and the part 39b where the housing outer circumferential wall 31 and the housing inner circumferential wall 32 extend in the second orthogonal directions Y. The corner part C2 is positioned on the downstream side of the first compartment S11e in the water flow direction X1. Therefore, in the housing B and the electrical connection box 1 according to the present embodiment, the sealing rib 61 is positioned on the upstream side of the corner part C2 in the water flow direction X1. As a result, in the housing B and the electrical connection box 1 according to the present embodiment, even when water flows in the space part S2, the sealing rib 61 prevents the water from flowing further, and thus prevents the water from reaching the corner part C2, making it possible to further reduce the occurrence of such an event that the electronic components D that are able to accept electric power are affected.

The housing B and the electrical connection box 1 according to the present embodiment are configured as described below. The upper end part 310 of the housing outer circumferential wall 31 has the inclined part 31I that is inclined from the one side toward the other side in the first orthogonal directions X and from the lower side toward the upper side in the upper and lower directions Z. The sealing rib 61 is positioned at a middle location of the inclined part 31I, or on the downstream side of the inclined part 31I in the water flow direction X1, Therefore, the housing B and the electrical connection box 1 according to the present embodiment make it possible to use the inclined part 31I and gravity to reduce an amount of water reaching the sealing rib 61. As a result, the housing B and the electrical connection box 1 according to the present embodiment make it possible to further reduce the occurrence of such an event that the electronic components D that are able to accept electric power are affected.

The housing B and the electrical connection box 1 according to the present embodiment are configured as described below. The ribs 6 include the area reduction ribs 62 that reduce the space part S2 in area. The area reduction ribs 62 are positioned on the upstream side of the sealing rib 61 in the water flow direction X1. In the housing B and the electrical connection box 1 according to the present embodiment, water flowing from the one side toward the other side in the first orthogonal directions X comes into contact with the area reduction ribs 62 before reaching the sealing rib 61, allowing the area reduction ribs 62 to reduce an amount of water reaching the sealing rib 61. As a result, the housing B and the electrical connection box 1 according to the present embodiment make it possible to further reduce the occurrence of such an event that the electronic components D that are able to accept electric power are affected.

The housing B and the electrical connection box 1 according to the present embodiment are configured as described below. The housing main body 3 further has the housing couplers 33 that couple the housing outer circumferential wall 31 and the housing inner circumferential wall 32. The housing couplers 33 are provided to be spaced from each other in the first orthogonal directions X, and the housing couplers 33, the housing outer circumferential wall 31, and the housing inner circumferential wall 32 form the discharge space S4 that is in communication with the space part S2 via the gap S3 and that extends downward. Therefore, in the housing B and the electrical connection box 1 according to the present embodiment, even when water flows in the space part S2, it is possible to discharge the water in the space part S2 toward outside of the accommodation space S1 via the gap S3 and the discharge space S4. As a result, the housing B and the electrical connection box 1 according to the present embodiment make it possible to suppress water from entering the accommodation space S1, making it possible to further reduce the occurrence of such an event that the electronic components D that are able to accept electric power are affected.

Note that the housing B and the electrical connection box 1 according to the embodiment described above are not limited to the embodiment described above, but various modifications can be made within the scope of the claims. For example, it has been described above that the housing B and the electrical connection box 1 according to the embodiment described above have one sealing rib, that is, the sealing rib 61. However, the housing B and the electrical connection box 1 according to the present embodiment are not limited to the configuration, but may include a plurality of the sealing ribs 61.

In the housing B and the electrical connection box 1 according to the embodiment described above, it has been described that the sealing rib 61 is disposed at the boundary between the first compartment S11e and the second compartment S11n in the water flow direction X1. However, the present invention is not limited to the configuration, but the sealing rib 61 only needs to seal the space part S2 that is positioned outside of the accommodation space S1 in which the second compartment S11n is positioned in the second orthogonal directions Y, Furthermore, in the housing B and the electrical connection box 1 according to the embodiment described above, it has been described that the area reduction ribs 62 are provided on the lid body 5. However, the present invention is not limited to the configuration, but the area reduction ribs 62 may not be provided on the lid body 5.

In the embodiment described above, it has been described that the housing B includes the housing main body 3, the bottom body 4, and the lid body 5. However, the embodiment is not limited to the configuration, and the housing main body 3 and the bottom body 4 may be integrally formed, and the housing B may include the integrally formed housing main body 3 and bottom body 4 described above and the lid body 5.

Furthermore, in the embodiment described above, the housing B has been described where the inclined part 311 of the housing outer circumferential wall 31 has the inclination angle that is constant relative to the horizontal plane. However, the embodiment is not limited to the configuration, but the inclination angle relative to the horizontal plane may gradually increase or decrease, or may be set in another way.

In the housing B and the electrical connection box 1 according to the embodiment described above, it has been described that the gap S3 is formed between the lid body inner circumferential wall 52 and the housing outer circumferential wall 31. However, the embodiment is not limited to the configuration, but the gap S3 may be formed between the lid body outer circumferential wall 51 and the housing outer circumferential wall 31 in the housing B and the electrical connection box 1. That is, in the housing B according to the present embodiment, the gap S3 should be formed at least either between the lid body outer circumferential wall 51 and the housing outer circumferential wall 31 or between the lid body inner circumferential wall 52 and the housing outer circumferential wall 31.

A housing and an electrical connection box according to the present embodiments are configured as described below. An accommodation space includes a plurality of compartments that are positioned adjacent to a housing inner circumferential wall. The compartments include a first compartment that is positioned on a downstream side of a sealing rib in a water flow direction in which, when water enters a space part, the water flows, among first orthogonal directions, and that is provided with electronic components that are able to accept electric power, and a second compartment that is positioned on an upstream side of the sealing rib, and that is not provided with the electronic components that are able to accept electric power. The sealing rib is positioned outside of the accommodation space in the second compartment in second orthogonal directions orthogonal to each of the upper and lower directions and the first orthogonal directions. As a result, the housing and the electrical connection box according to the present invention make it possible to control a location at which water may enter the accommodation space, making it possible to reduce the occurrence of such an event that electronic components that can accept electric power are affected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A housing comprising:
   a housing main body that is formed into a frame shape having an opening part, and that has an accommodation space configured to accommodate electronic components therein; and
   a lid body that is stacked upward on the housing main body in upper and lower directions, and that seals the opening part, wherein
   the housing main body has a housing outer circumferential wall, and a housing inner circumferential wall that is positioned inside of the housing outer circumferential wall,
   the lid body has a top board having a plate shape, a lid body outer circumferential wall that projects from a circumferential part of the top board toward the housing main body in the upper and lower directions, a lid body inner circumferential wall that is positioned inside of the lid body outer circumferential wall, and that surrounds, with the lid body outer circumferential wall, the housing outer circumferential wall that is inserted, and ribs that couple the lid body outer circumferential wall and the lid body inner circumferential wall,
   the accommodation space includes a plurality of compartments that are positioned adjacent to the housing inner circumferential wall,
   the lid body outer circumferential wall, the lid body inner circumferential wall, and an upper end part of the housing outer circumferential wall form a space part that surrounds the accommodation space,
   a gap is formed at least either between the lid body outer circumferential wall and the housing outer circumferential wall and between the lid body inner circumferential wall and the housing outer circumferential wall,
   the ribs are disposed and spaced in first orthogonal directions orthogonal to the upper and lower directions, the ribs include a sealing rib,
   the compartments include a first compartment that is positioned on a downstream side of the sealing rib with respect to one of the first orthogonal directions, and that is configured to accommodate the electronic components capable of accepting electric power, and a second compartment that is positioned on an upstream side of the sealing rib with respect to the one of the first orthogonal directions, and that is not provided with the electronic components capable of accepting electric power, and
   the sealing rib is positioned in the space part and outside of the second compartment in second orthogonal directions orthogonal to the upper and lower directions and the first orthogonal directions, the sealing rib seals the first compartment from the space part in the one of the first orthogonal directions.

2. The housing according to claim 1, wherein
the housing main body further has housing couplers that couple the housing outer circumferential wall and the housing inner circumferential wall,
the housing couplers are provided to be spaced from each other in the first orthogonal directions, and
the housing couplers, the housing outer circumferential wall, and the housing inner circumferential wall form a discharge space that is in communication with the space part via the gap and that extends downward.

3. The housing according to claim 1, wherein
the ribs include area reduction ribs that reduce the space part in area, and
the area reduction ribs are positioned on the upstream side of the sealing rib with respect to the one of the first orthogonal directions.

4. The housing according to claim 3, wherein
the housing main body further has housing couplers that couple the housing outer circumferential wall and the housing inner circumferential wall,
the housing couplers are provided to be spaced from each other in the first orthogonal directions, and
the housing couplers, the housing outer circumferential wall, and the housing inner circumferential wall form a discharge space that is in communication with the space part via the gap and that extends downward.

5. The housing according to claim 1, wherein
the housing has a corner part positioned between a part where the housing outer circumferential wall and the housing inner circumferential wall extend in the first orthogonal directions and a part where the housing outer circumferential wall and the housing inner circumferential wall extend in the second orthogonal directions, and
the corner part is positioned on a downstream side of the first compartment with respect to the one of the first orthogonal directions.

6. The housing according to claim 5, wherein
the upper end part of the housing outer circumferential wall has an inclined part that is inclined from one side toward another side in the first orthogonal directions and from a lower side toward an upper side in the upper and lower directions, and a flat part that is flat in the upper and lower directions,
the sealing rib is disposed between the inclined part and the flat part,
the first compartment is disposed adjacent to the corner part, and
the corner part is disposed on the flat part.

7. The housing according to claim 5, wherein
the housing main body further has housing couplers that couple the housing outer circumferential wall and the housing inner circumferential wall,
the housing couplers are provided to be spaced from each other in the first orthogonal directions, and
the housing couplers, the housing outer circumferential wall, and the housing inner circumferential wall form a discharge space that is in communication with the space part via the gap and that extends downward.

8. The housing according to claim 6, wherein
the housing main body further has housing couplers that couple the housing outer circumferential wall and the housing inner circumferential wall,
the housing couplers are provided to be spaced from each other in the first orthogonal directions, and
the housing couplers, the housing outer circumferential wall, and the housing inner circumferential wall form a discharge space that is in communication with the space part via the gap and that extends downward.

9. The housing according to claim 5, wherein
the ribs include area reduction ribs that reduce the space part in area, and
the area reduction ribs are positioned on the upstream side of the sealing rib with respect to the one of the first orthogonal directions.

10. The housing according to claim 9, wherein
the housing main body further has housing couplers that couple the housing outer circumferential wall and the housing inner circumferential wall,
the housing couplers are provided to be spaced from each other in the first orthogonal directions, and
the housing couplers, the housing outer circumferential wall, and the housing inner circumferential wall form a discharge space that is in communication with the space part via the gap and that extends downward.

11. The housing according to claim 3, wherein
the ribs include area reduction ribs that reduce the space part in area, and
the area reduction ribs are positioned on the upstream side of the sealing rib with respect to the one of the first orthogonal directions.

12. The housing according to claim 11, wherein
the housing main body further has housing couplers that couple the housing outer circumferential wall and the housing inner circumferential wall,
the housing couplers are provided to be spaced from each other in the first orthogonal directions, and
the housing couplers, the housing outer circumferential wall, and the housing inner circumferential wall form a discharge space that is in communication with the space part via the gap and that extends downward.

13. An electrical connection box comprising:
a housing that includes an accommodation space;
a wire harness extending into the housing;
electronic components located in the accommodation space and electrically connected to the wire harness, wherein
the housing includes
a housing main body that is formed into a frame shape having an opening part, and that has the accommodation space accommodating the electronic components therein, and
a lid body that is stacked upward on the housing main body in upper and lower directions, and that seals the opening part,
the housing main body has a housing outer circumferential wall, and a housing inner circumferential wall that is positioned inside of the housing outer circumferential wall,
the lid body has a top board having a plate shape, a lid body outer circumferential wall that projects from a circumferential part of the top board toward the housing main body in the upper and lower directions, a lid body inner circumferential wall that is positioned inside of the lid body outer circumferential wall, and that surrounds, with the lid body outer circumferential wall, the housing outer circumferential wall that is inserted, and ribs that couple the lid body outer circumferential wall and the lid body inner circumferential wall,
the accommodation space includes a plurality of compartments that are positioned adjacent to the housing inner circumferential wall,
the lid body outer circumferential wall, the lid body inner circumferential wall, and an upper end part of the housing outer circumferential wall form a space part that surrounds the accommodation space, a gap is formed at least either between the lid body outer circumferential wall and the housing outer circumferential wall and between the lid body inner circumferential wall and the housing outer circumferential wall, the ribs are disposed and spaced in first orthogonal directions orthogonal to the upper and lower directions, the ribs include a sealing rib, the compartments include a first compartment that is positioned on a downstream side of the sealing rib with respect to one of the first orthogonal directions, and that is provided with the electronic components capable of accepting electric power, and a second compartment that is positioned on an upstream side of the sealing rib with respect to the one of the first orthogonal directions, and that is not provided with the electronic components capable of accepting electric power, and the sealing rib is positioned in the space part and outside of the second compartment in second orthogonal directions orthogonal to the upper and lower directions and the first orthogonal directions, the sealing rib seals the first compartment from the space part with respect to the one of the first orthogonal directions.

* * * * *